United States Patent [19]

Alavie et al.

[11] Patent Number: 5,694,501
[45] Date of Patent: Dec. 2, 1997

[54] APPARATUS AND METHOD OF BRAGG INTRA-GRATING STRAIN CONTROL

[75] Inventors: A. Tino Alavie; Shangyuan Huang, both of North York; Michael J. LeBlanc, Scarborough; Robert Maaskant, King City; Raymond M. Measures, Thornhill; Myo Myint Ohn, North York, all of Canada

[73] Assignee: Electrophotonics Corporation, Concord, Canada

[21] Appl. No.: 550,565

[22] Filed: Oct. 31, 1995

[30] Foreign Application Priority Data

Nov. 2, 1994 [CA] Canada ................................ 2134958

[51] Int. Cl.⁶ .................................................. G02B 6/34
[52] U.S. Cl. .......................... 385/37; 385/10; 385/12; 372/102
[58] Field of Search ........................... 385/37, 12, 10, 385/123; 372/6, 102

[56] References Cited

U.S. PATENT DOCUMENTS

| | | | |
|---|---|---|---|
| 4,474,427 | 10/1984 | Hill et al. | 350/96.3 |
| 4,953,939 | 9/1990 | Epworth | 350/96.19 |
| 5,007,705 | 4/1991 | Morey et al. | 385/12 |
| 5,317,576 | 5/1994 | Leonberger et al. | 372/102 X |

*Primary Examiner*—Phan T. H. Palmer
*Attorney, Agent, or Firm*—Dowell & Dowell; Lynn C. Schumacher

[57] ABSTRACT

The present invention provides a method and apparatus for controlling the detailed strain field imposed on a guided-wave Bragg grating. The spectral and temporal form of radiant energy traveling down optical fibers is important in many fields, including communications and sensing. The spectral distribution and center wavelength of short optical pulses is of particular importance. In the communication field the information carrying capacity of an optical fiber can be limited by the dispersion experienced by short pulses as they propagate along an optical fiber. Chirped fiber optic intracore Bragg gratings can be used to compensate for this dispersion. However, a grating with a different degree of chirp would be required for each particular communication system. This control of the intra-grating strain distribution allows the grating to be tuned over a broad spectral range or chirped in a manner that permits it to compensate for a wide range of dispersion with or without a shift in the grating center wavelength. In addition, precise control of the strain distribution along a grating can be used to manufacture a variety of spectral filters.

21 Claims, 10 Drawing Sheets

APPARATUS AND METHOD OF BRAGG INTRA-GRATING STRAIN CONTROL

FIELD OF THE INVENTION

The present invention relates to method and apparatus for the control of the properties of a guided-wave Bragg grating through the imposition of an intra-grating strain distribution.

BACKGROUND OF THE INVENTION

The present invention relates to the broad use of guided wave Bragg gratings and in particular fiber optic intracore Bragg gratings. The latter devices have been employed as narrow band optical filters and mirrors in the fiber optic field since their invention. Their use was greatly accelerated by improved methods of fabrication based on transverse holographic illumination. The sensitivity of the reflective spectrum centre wavelength of the intracore Bragg gratings to the strain and thermal environment to which they are subjected has made them very popular as sensors and as tuning elements for fiber and diode lasers. Chirped gratings have been shown to compensate for the dispersion experienced by short optical pulses traversing a length of optical fiber. A number of methods of fabricating chirped gratings have been devised but each grating is limited to a fixed narrow range of dispersion compensation. The application of an appropriate strain gradient to a grating allows its chirp to be adjusted and extends the range of compensation for which it can be used.

SUMMARY OF THE INVENTION

The wavelength of peak reflection for a Bragg grating can be shifted by a change in either the strain or the temperature imposed on the grating. If the grating is subject to a strain or temperature gradient the modulation period of the index of refraction and the mean index of refraction becomes a function of position along the grating. This chirp in the grating leads to both a shift and a broadening of the reflective spectrum of the grating. This chirp of the grating also means that the different wavelength components of an incident light pulse are reflected from different locations along the grating. An appropriately chirped grating can therefore compensate for dispersion suffered by a short duration light pulse that has propagated a certain length of an optical fiber.

The present invention involves the imposition of a precise strain distribution along the length of a Bragg grating in order to accurately control its properties. This allows the grating centre wavelength to be tuned over a wide spectral range, and its spectral distribution to be accurately tailored. The grating can thus serve as a narrow band tunable filter or mirror with an adjustable bandwidth. This form of controlled Bragg grating can be applied to laser tuning, laser mode locking or optical dispersion compensation and has broad application to the fields of optical fiber communications and sensing. The ability to independently control the chirp and the centre frequency of the reflective or transmissive spectrum of a fiber optic intracore Bragg grating is of particular relevance to the optical communication field.

The method and apparatus forming the present invention allows rapid imposition of a precise intra-grating strain distribution in order to accurately control the transmissive, reflective and phase properties of a fiber optic intracore Bragg grating. The invention has a compact and durable form that allows the characteristics of the Bragg grating, such as centre wavelength, spectral shape or dispersion compensation characteristics to be quickly changed or precisely maintained. The applications for this invention include: an intrinsic optical fiber dispersion compensation device with no wavelength shift, an intrinsic optical fiber dispersion compensation device with an adjustable wavelength shift, an in-line fiber optic spectral filter that can be tuned and have an adjustable bandwidth and wavelength selection properties, and tunable narrow band in-fiber reflectors with controllable bandwidth for fiber and diode lasers.

There are two methods of controlling the strain distribution along the grating. One method involves the use of a set of independently controlled transducer elements that are distributed along the length of the grating. This gives the greatest versatility in terms of control. Examples of possible transducer elements are: piezoelectric, electrostrictive, magnetostrictive, shape memory alloy, or thermo-electric actuators.

The second method relies on embedding, or attaching, the grating to a small structural element in a manner that permits a precise strain distribution to be imposed on the grating by means of bending, twisting or tensing (or a combination thereof) the element. Selection of the architecture of the beam and the configuration of the grating with respect to the beam and its neutral axis permits a broad range of strain distributions to be imposed on the grating. Both methods can produce a specified spectral profile with, or without, a shift in the centre wavelength of the grating. The latter is the most useful for the telecommunications field, as it allows dispersion compensation with no wavelength shift.

In one preferred embodiment of the invention a Bragg grating is embedded within, or attached to, a structural element that is strained by means of a set of transducer elements in the form of a segmented piezoelectric stack that can be selectively excited at a number of positions along the length of the grating. This segmented piezoelectric stack can be used to impose a precise strain distribution along the length of the grating, or vary it rapidly. This permits tuning of the centre wavelength of the grating and/or controlling its spectral profile. This invention allows, for example, an appropriate chirp to be imposed on a fiber optic intracore Bragg grating such that it can be used to compensate for the dispersion experienced by short optical pulses traversing an arbitrary length of optical fiber without shifting the centre wavelength of the grating. In addition, the centre wavelength of the grating can be shifted to any desired value. This can be applied to alter the spectral profile of gratings chirped at fabrication and gratings which have not been chirped at fabrication.

In another embodiment a Bragg grating is embedded within a specially shaped cantilever beam that subjects the grating to near linear strain gradients when the tip of the beam is deflected. Here too the strain gradient can be tailored so as to provide dispersion compensation with or without a shift of wavelength. The precise tailoring of the strain field in the grating is controlled by the shape of the beam, the external load or deformation imposed on it, and the specific location and geometry of the grating attachment to the beam.

BRIEF DESCRIPTION OF THE DRAWINGS

The method and apparatus of Bragg intra-grating strain control forming the present invention will now be described, by example only, reference being had to the accompanying drawings, in which.

DETAILED DESCRIPTION OF THE INVENTION

The present invention involves the following novel features:

1. A method of tailoring the spectral profile and wavelength characteristics of a guided-wave Bragg grating by imposing a precisely controlled strain or temperature distribution along the length of the grating;
2. A method of ensuring that a grating chirp can be produced with no shift in the centre wavelength of the grating's reflective spectrum, if desired;
3. A means of imposing a precisely controlled strain distribution on a grating with a set of independently controlled transducer elements distributed along the length of the grating; and
4. A means of imposing a precisely controlled strain distribution on a grating attached to or embedded along a selected path in a structural element by bending, twisting and/or tensing deformations.

In the case of a uniform guided-wave Bragg grating with a periodic variation {period-$\Lambda$} in the guiding core index of refraction {with mean core index $n_{\mathit{eff}}$} the wavelength of peak reflectivity, $\lambda_B$, is given by equation (1) below:

$$\lambda_B = 2n_{\mathit{eff}} \Lambda. \tag{1}$$

Figure 1:
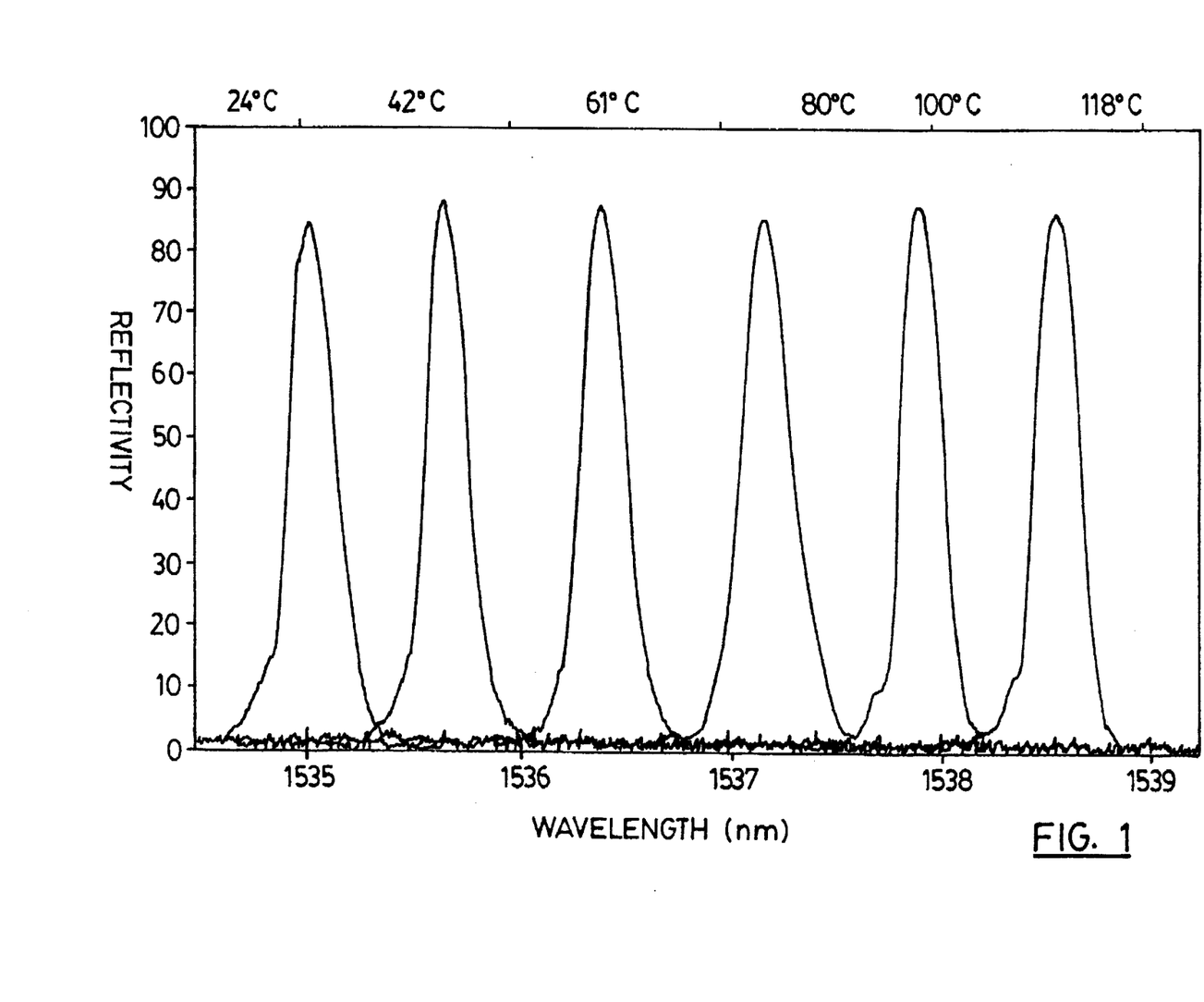
FIG. 1 is a set of six reflective spectra for a fiber optic intracore Bragg grating operating at the six temperatures shown.

If the grating is subject to a strain that is uniform along its length, or a change in temperature, its Bragg {centre} wavelength will shift by an amount that is proportional to the strain or change in the temperature. An example of the shift in the Bragg wavelength as the temperature is increased is presented as FIG. 1. If the strain is not uniform along the length of the grating its influence can be determined by representing the grating by a set of small Bragg grating elements each of which can be assumed to have a uniform strain along its length. Each grating element, however, is subject to a slightly different strain from its neighbour.

Figure 2:
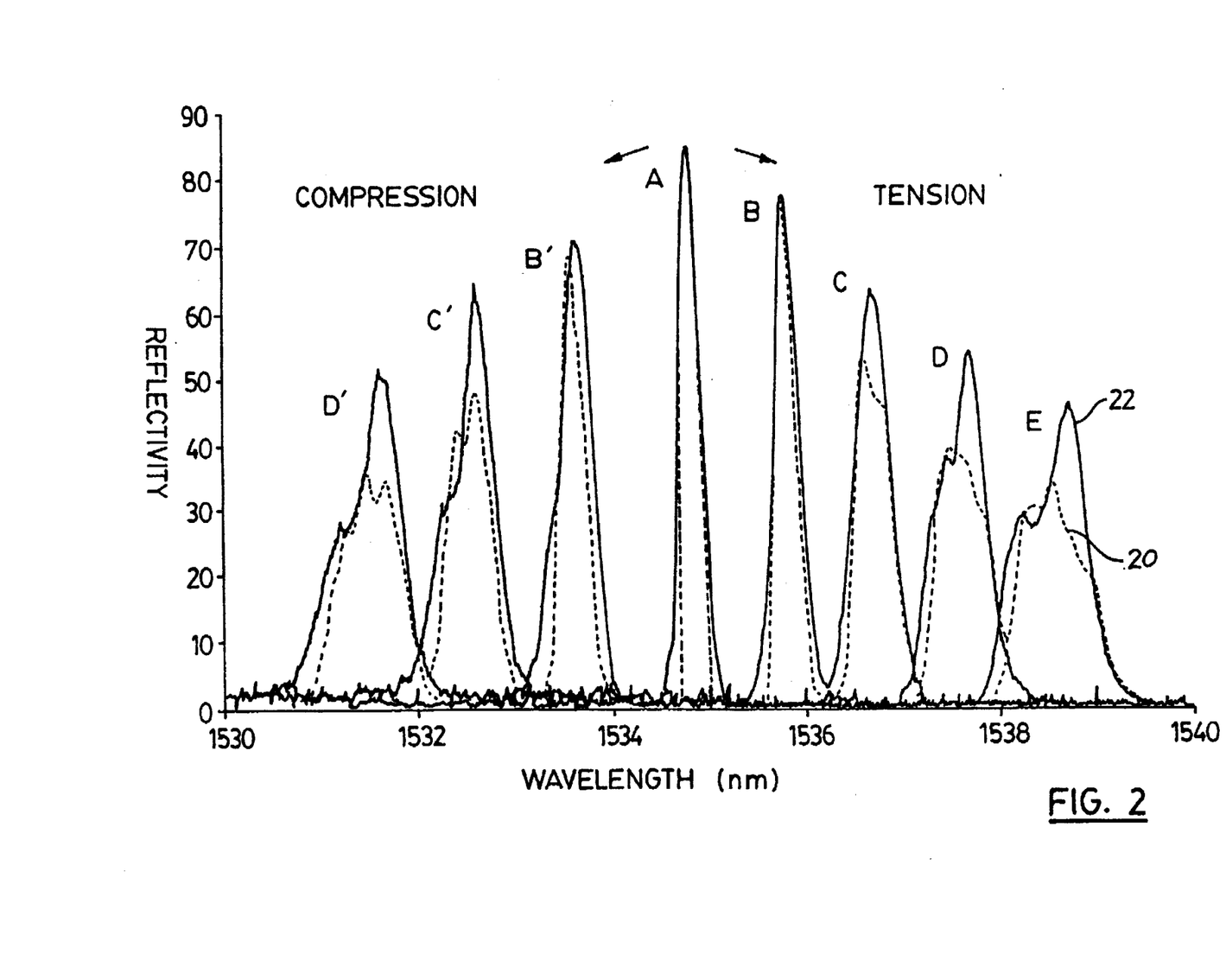
FIG. 2 is a set of eight experimental and calculated reflective spectra for a fiber optic intracore Bragg grating subject to the eight strain gradients displayed in FIG. 3(a)
Figure 3A:
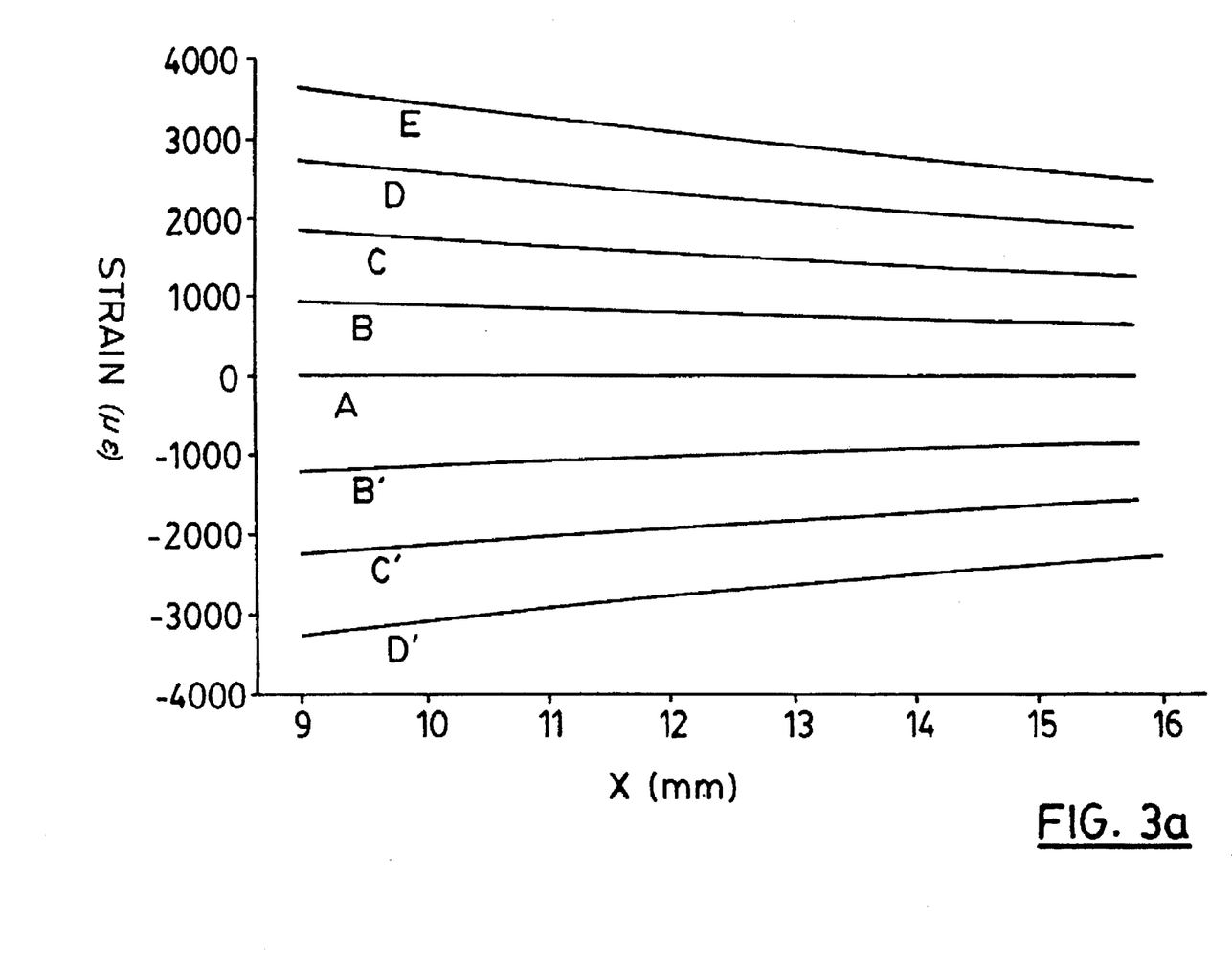
FIG. 3(a) is a set of eight strain gradients calculated from the corresponding deflections of the specially shaped cantilever beam shown in FIG. 3(b)
Figure 3B:
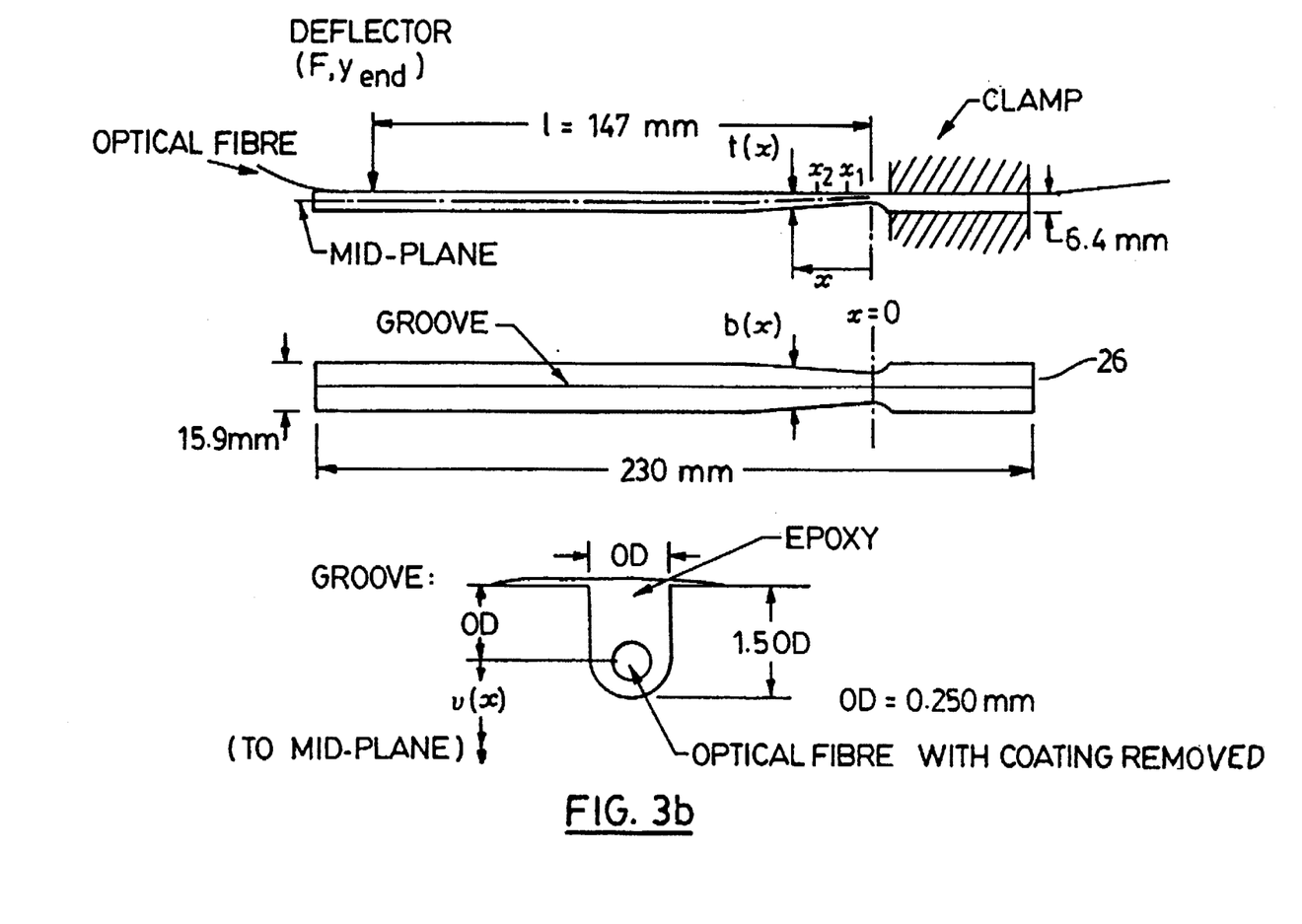

A transfer matrix formulation based on coupled-mode theory has been used to treat the interaction of the optical field with each grating element and evaluate the change in the properties of the total grating subject to specific forms of strain distribution. An example of the change in the reflective spectrum of a fiber optic intracore Bragg grating subject to an increasing {approximately linear} strain gradient is presented as FIG. 2. In this example the index modulation of the grating was taken to be roughly a Gaussian function of the axial position about the centre of the grating. For this case it is clear that the predicted reflective spectrum of the grating, shown at 20, is progressively broadened with increasing strain gradient, a result that is in close agreement with experimental reflective spectra that are shown at 22 in FIG. 2. The corresponding set of strain gradients as calculated for a specially shaped aluminum cantilever beam are presented in FIG. 3(a). This beam 26 is illustrated in FIG. 3(b). It is also apparent in FIG. 2 that although use of the tapered aluminum beam 26, shown in FIG. 3(b), can produce appreciable variations in the chirp of the grating, there is a concomitant shift in the wavelength of the peak reflectivity. This shift may not always be desirable.

The invention involves both a method and an apparatus for controlling the strain distribution of a guided-wave Bragg grating in order to tailor its spectral properties. Of particular importance are the centre wavelength and chirp of its reflective and transmissive properties.

Figure 4:
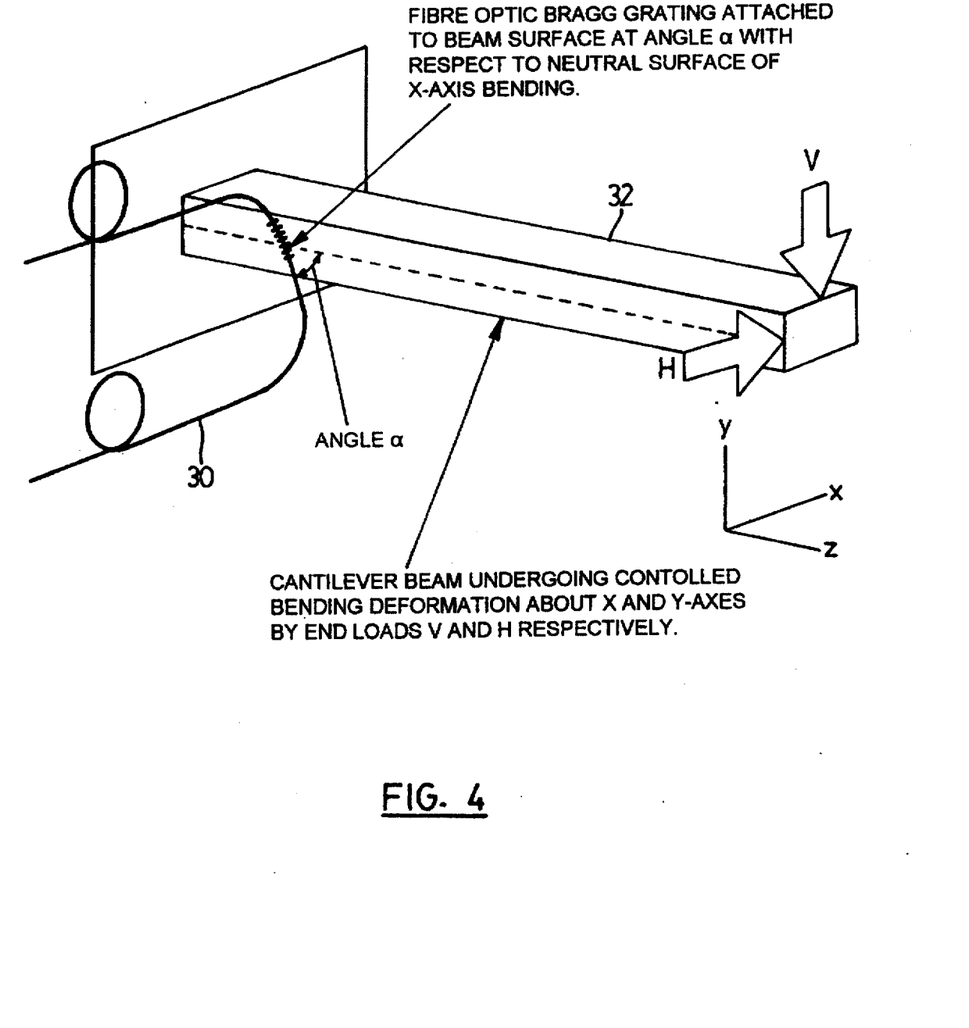
FIG. 4 is a schematic diagram of a grating attached to a beam in such a way that independent control of an imposed chirp and wavelength shift is achieved by bending about both the x and y-axes.

In one embodiment of the invention (FIG. 4) a fiber optic intracore Bragg grating 30 is embedded within a specially shaped support structure 32 that imposes a precise strain distribution on the grating through: bending, twisting or tensing of this structural element. The exact form of the structure's architecture and path of the grating through the structure are also important in achieving precise control of the strain distribution. Anti-symmetrical straining of the grating, so that half of it is subject to tension while the other half is subject to compression, permits a significant chirp to be achieved with no shift in the wavelength of peak reflectivity. In this way the strain gradient is tailored so as to provide dispersion compensation with no shift of wavelength. This is very desirable for optical communications. A cantilever beam that is subject to simple deflection of its tip is one of the simplest forms of grating controlling structures. In this case mounting of the grating symmetrically about the neutral axis ensures zero wavelength shift no matter how much chirp is imposed on the grating. In this embodiment this chirp can be achieved together with independent control of the centre wavelength by also twisting the beam or by biaxial bending of the beam, as shown in FIG. 4.

Figure 5A:
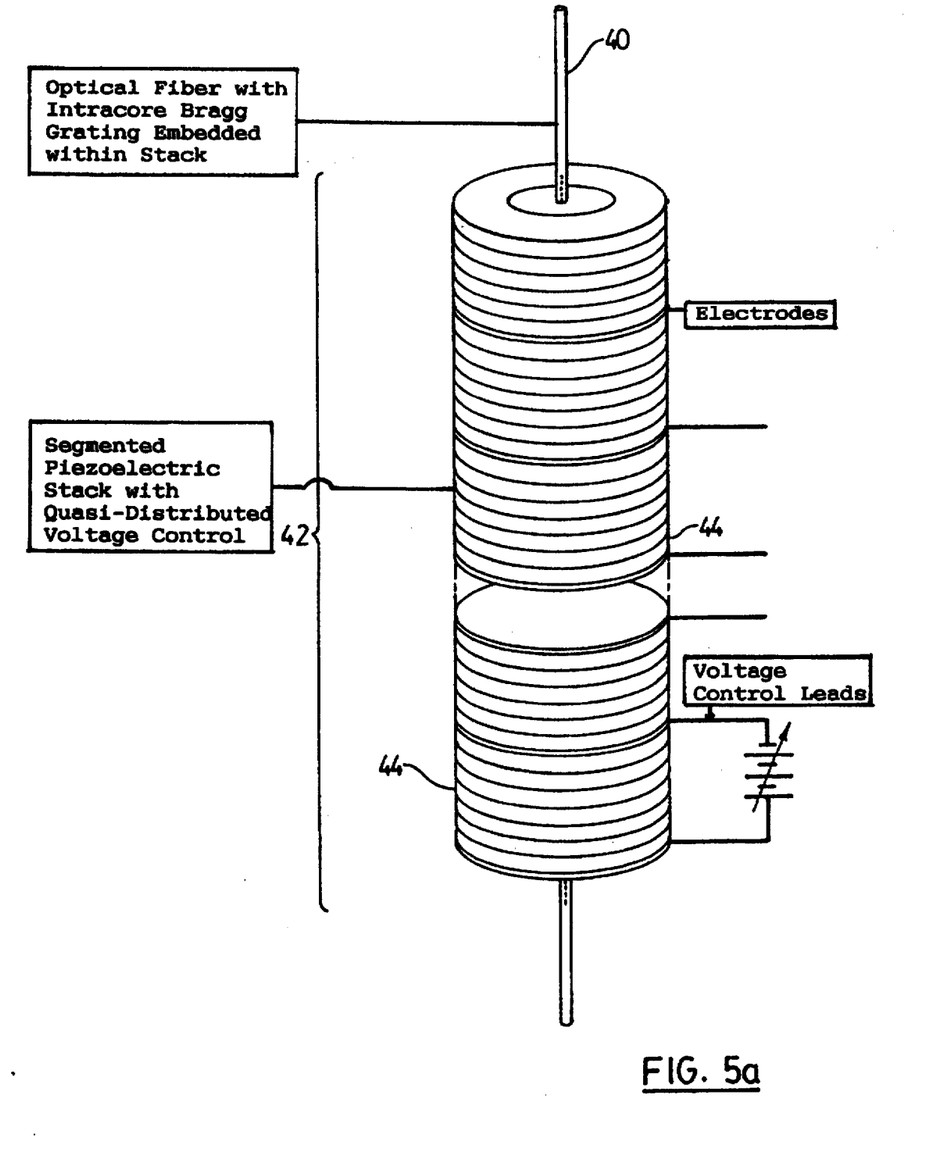
FIG. 5(a) is a schematic diagram of a preferred embodiment of the invention illustrating the embedment of an fiber optic intracore Bragg grating within a piezoelectric stack with quasi-distributed voltage control.
Figure 5B:
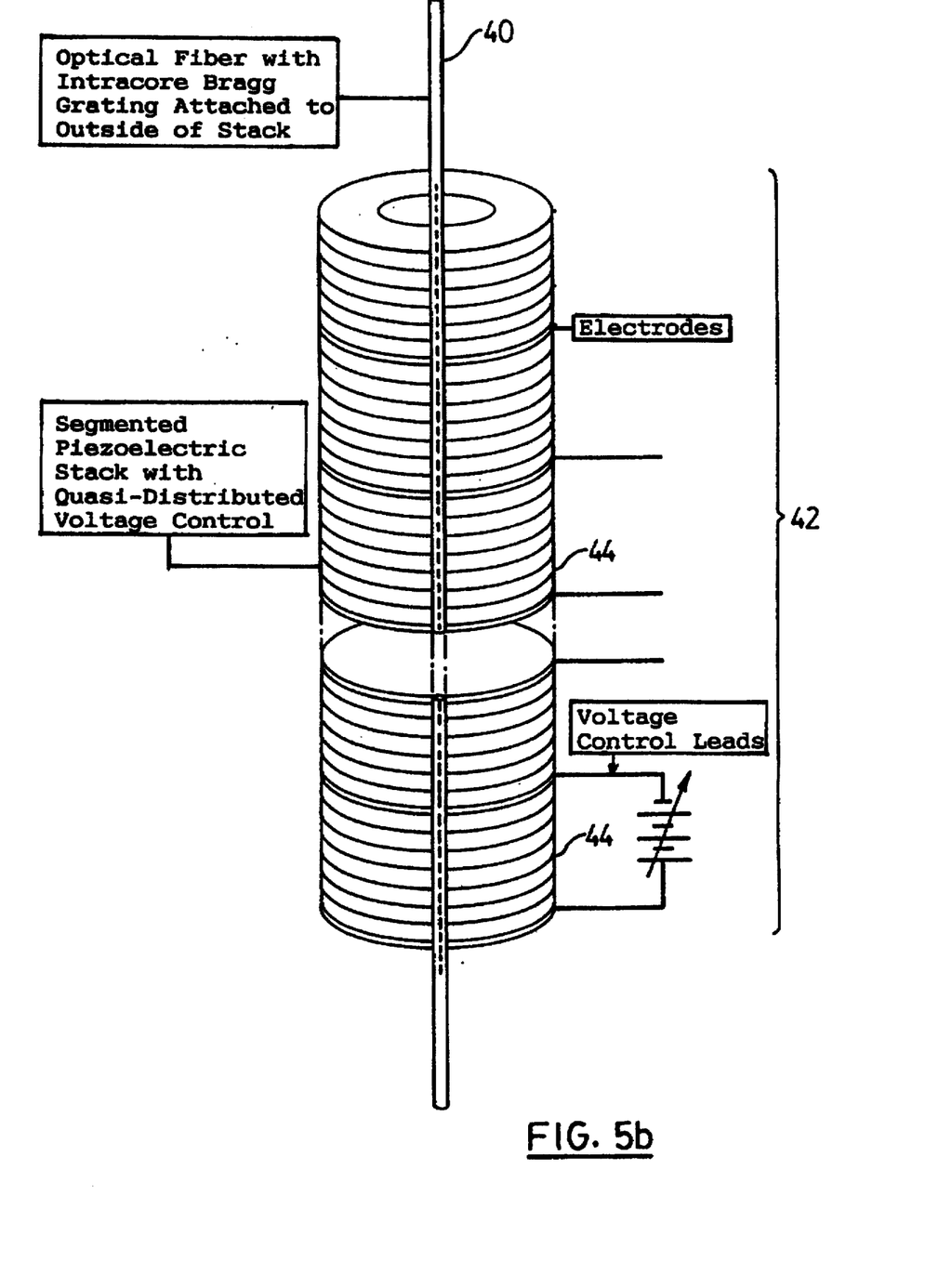
FIG. 5(b) is a schematic diagram of a preferred embodiment of the invention illustrating the mounting of an fiber optic intracore Bragg grating to the exterior of a piezoelectric stack with quasi-distributed voltage control.
Figure 6A:
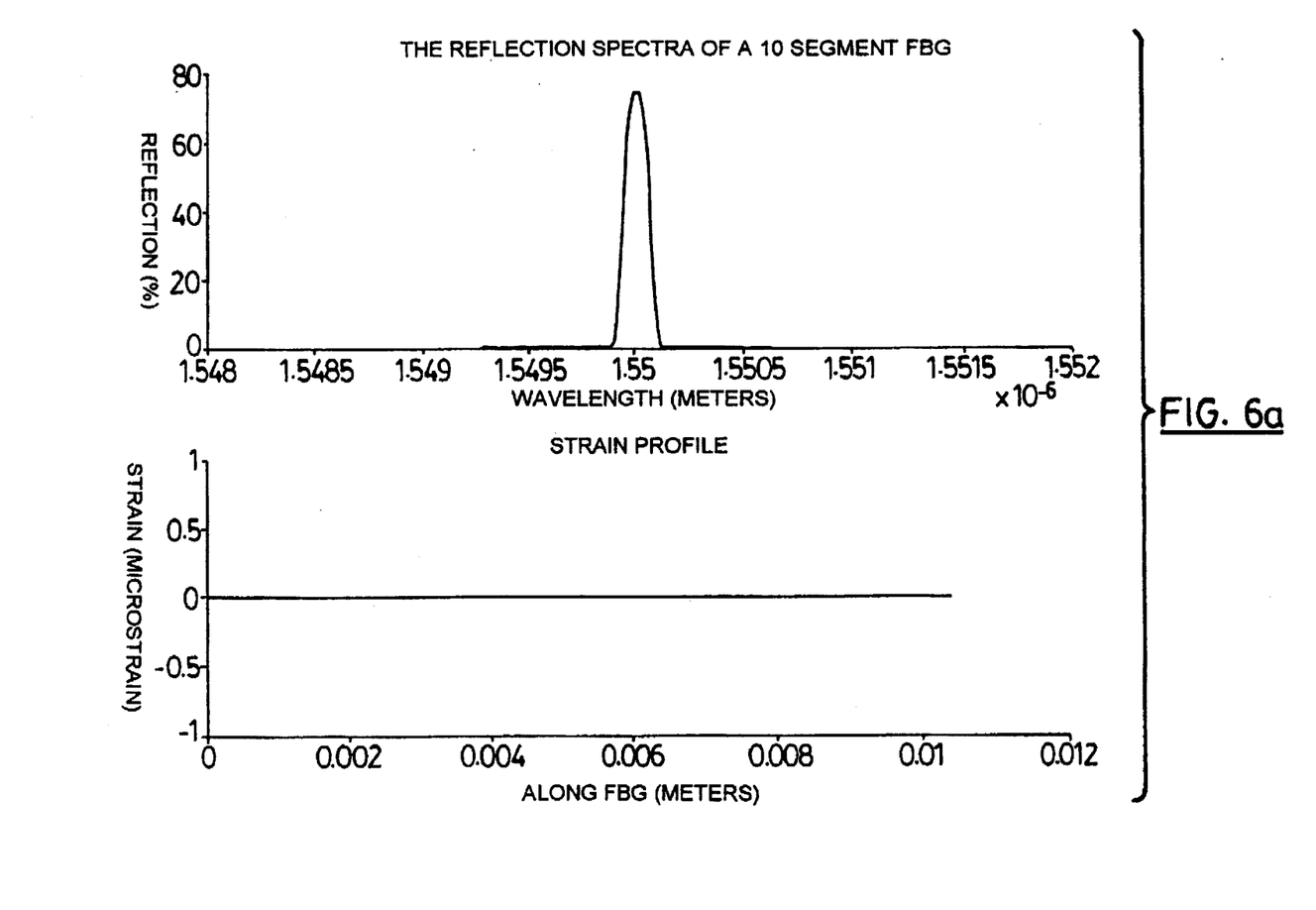
FIG. 6 is a series of plots of reflection spectra from a fiber optic Bragg grating subjected to various strain profiles: (a) uniform strain profile, (b) strain increasing in uniform steps along the length of the grating, (c) square wave strain profile.
Figure 6B:
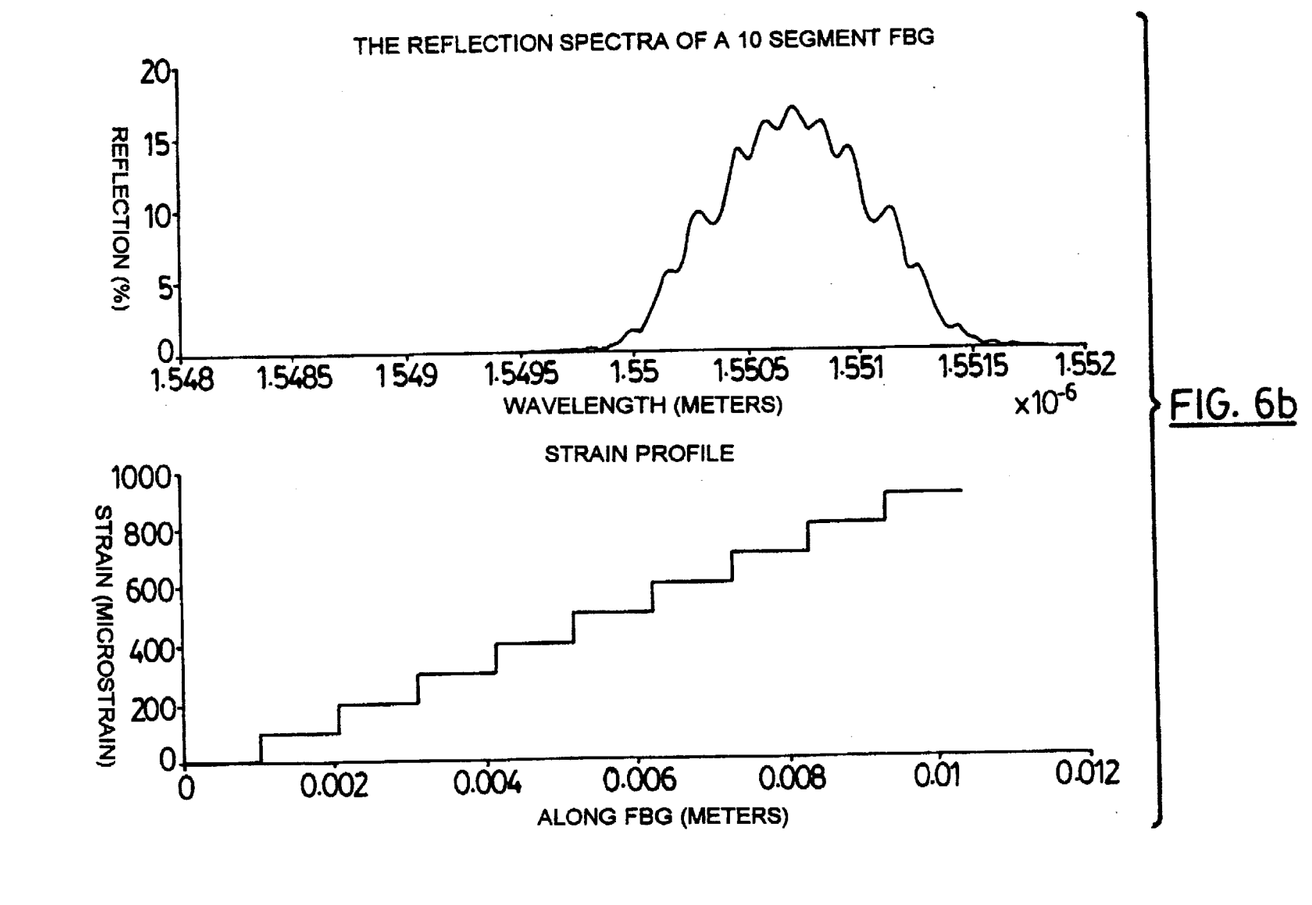
Figure 6C:
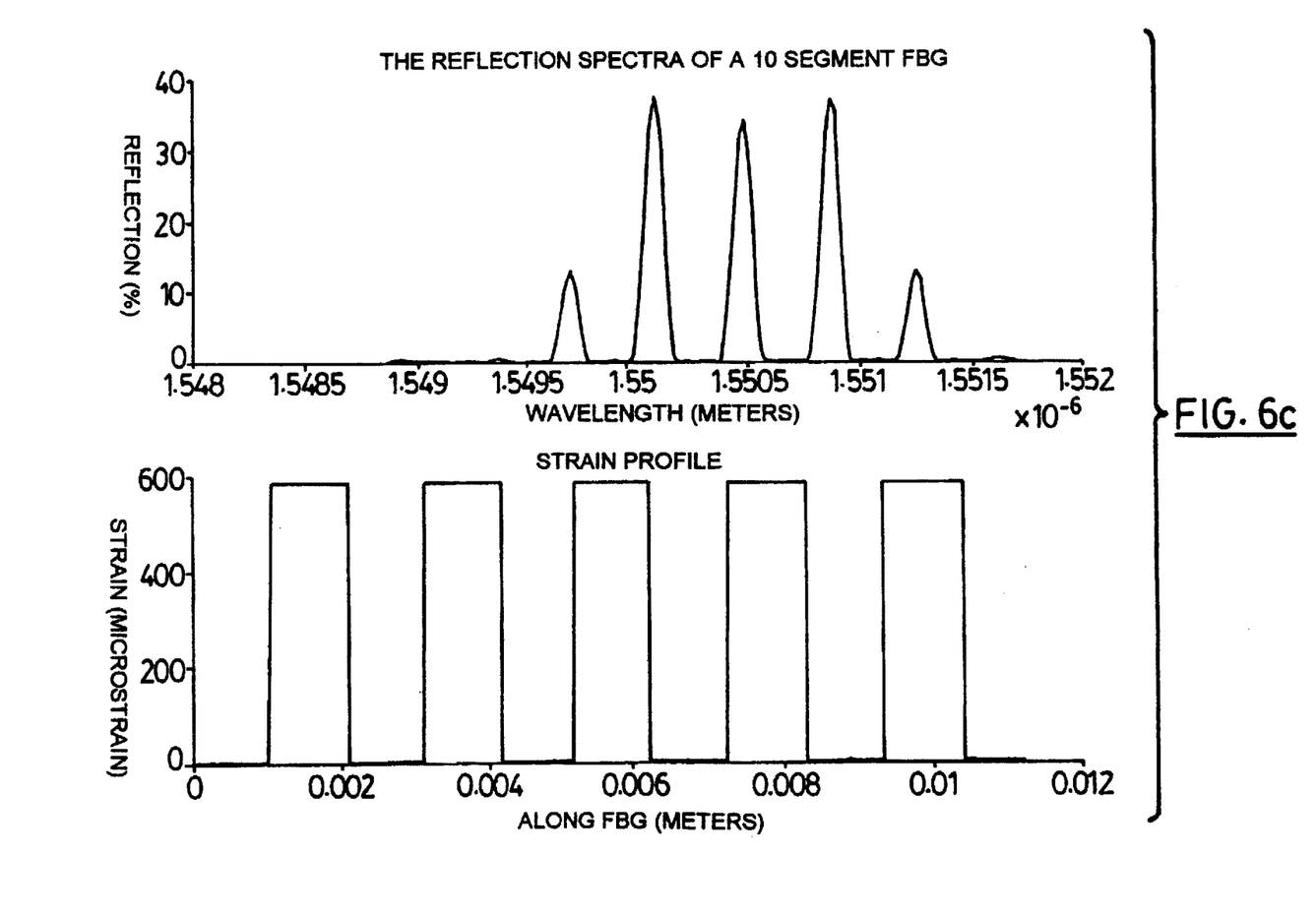

In another preferred embodiment of the invention a fiber optic intracore Bragg grating 40 is either embedded within (FIG. 5(a)), or attached to the exterior of (FIG. 5(b)), a segmented piezoelectric stack 42, the elements 44 of which can be selectively excited at a number of positions along its length. Since a variable voltage V can be applied to any part of the stack 42 independent of the voltage being applied to any other part of the stack, considerable control of the strain distribution impressed on the grating is possible with this device. This segmented piezoelectric stack 42 can thus be used to tune the centre wavelength of the grating or control the grating profile so as to broaden its reflective spectrum and compensate for a broad range of dispersion. This device can also be used to alter the shape of the reflective and transmissive spectra so as to produce a desired spectral filter as is illustrated in FIGS. 6(a), 6(b) and 6(c). Furthermore, this can be achieved with or without a shift in the wavelength of peak reflectivity by appropriate control of the imposed strain distribution. Alternatively, precise tuning of the grating centre wavelength can be produced with no chirp of the grating. The grating can also be mounted on some other structural element that is strained by a segmented piezoelectric stack. It is also possible to use in place of the segmented piezoelectric stack a set of other independently controlled transducer elements, such as: electrostrictive, magnetostrictive, shape memory alloy, or thermo-electric actuators.

Therefore what is claimed is:

1. A method of controlling spectral profile and centre wavelength properties of an intrinsic guided-wave Bragg grating by;

imposing on said grating of a preselected strain distribution along a length of said grating, wherein said preselected strain distribution is produced by independently controlled transducer elements distributed along the length of said grating and each transducer element being activated to responsively impose a strain in a portion of said grating adjacent to said transducer element.

2. A method of controlling the centre wavelength and the spectral profile of an intrinsic guided-wave Bragg grating according to claim 1 wherein said independently controlled transducer elements is a segmented piezoelectric stack comprising a plurality of piezoelectric elements each of which can be selectively excited.

3. A method of controlling the centre wavelength and the spectral profile of an intrinsic guided-wave Bragg grating according to claim 2 wherein said preselected strain distribution is adjusted such that an effective spectral profile is attained with no shift in centre wavelength.

4. A method of controlling the centre wavelength and the spectral profile of an intrinsic guided-wave Bragg grating according to claim 3 wherein said guided-wave Bragg grating is an intracore fiber optic Bragg grating.

5. A method of controlling the centre wavelength and the spectral profile of an intrinsic guided-wave Bragg grating according to claim 2, wherein shifting of centre wavelength of said grating is accomplished with no change in the spectral profile of the grating.

6. A method of controlling the centre wavelength and the spectral profile of an intrinsic guided-wave Bragg grating according to claim 5 wherein said guided-wave Bragg grating is an intracore fiber optic Bragg grating.

7. A method of controlling the centre wavelength and the spectral profile of an intrinsic guided-wave Bragg grating according to claim 2 wherein said guided-wave Bragg grating is an intracore fiber optic Bragg grating.

8. A method of controlling the centre wavelength and the spectral profile of an intrinsic guided-wave Bragg grating according to claim 2 wherein said spectral profile is altered but not said centre wavelength by anti-symmetrically straining said grating to subject a first portion thereof to tension and a second portion of said grating to compression.

9. A method of controlling a centre wavelength and spectral profile of an intrinsic guided-wave Bragg grating by imposition on said grating of a preselected strain distribution, comprising;

attaching said grating to a structural member and subjecting said structural member to a preselected combination of bending, twisting, tension or compression during passage of light through said grating.

10. A method of controlling the centre wavelength and the spectral profile of an intrinsic guided-wave Bragg grating according to claim 9 wherein said grating is an intracore fiber optic Bragg grating.

11. A method of controlling the centre wavelength and the spectral profile of an intrinsic guided-wave Bragg grating according to claim 10 wherein said intracore fiber optic Bragg grating is attached to or embedded within the structural member along a prespecified portion of said structural member such that the desired wavelength shift and spectral profile is achieved.

12. A method of controlling the centre wavelength and the spectral profile of an intrinsic guided-wave Bragg grating according to claim 10 wherein said spectral profile is altered but not said centre wavelength by anti-symmetrically straining said grating to subject a first portion thereof to tension and a second portion of said grating to compression.

13. A method of controlling spectral profile and centre wavelength of an intrinsic guided-wave Bragg grating by the imposition on said grating of a preselected temperature distribution along a length of said grating.

14. An apparatus for controlling a centre wavelength and a spectral profile of an intrinsic guided-wave Bragg grating, comprising;

a plurality of transducer means attached in preselected positions along said Bragg grating, each of said transducers including control means for controlling each transducer means independent of the other transducers.

15. An apparatus for controlling the centre wavelength and the spectral profile of an intrinsic guided-wave Bragg grating according to claim 14 wherein said plurality of transducer means is a segmented piezoelectric stack comprising a plurality of piezoelectric elements each having an associated control means, and each of which can be selectively excited.

16. An apparatus for controlling the centre wavelength and the spectral profile of an intrinsic guided-wave Bragg grating according to claim 15 wherein said guided-wave Bragg grating is an intracore fiber optic Bragg grating.

17. An apparatus for controlling the centre wavelength and the spectral profile of an intrinsic guided-wave Bragg grating according to claim 14 wherein said guided-wave Bragg grating is an intracore fiber optic Bragg grating.

18. An apparatus for controlling a centre wavelength and a spectral profile of an intrinsic guided-wave Bragg grating by control of strain distribution imposed on the grating, comprising;

a structural member with said Bragg grating being attached to said structural member, and means for subjecting said structural member to bending, twisting, compression, tension and combinations thereof.

19. An apparatus for controlling the centre wavelength and the spectral profile of an intrinsic guided-wave Bragg grating according to claim 18, wherein said grating is an intracore fiber optic Bragg grating.

20. An apparatus for controlling the centre wavelength and the spectral profile of an intrinsic guided-wave Bragg grating according to claim 19 wherein said intracore fiber optic Bragg grating is attached to or embedded within said structural member in a symmetrical manner about a neutral axis of said structural member such that the spectral profile is adjustable with no shift in the centre wavelength of the grating.

21. An apparatus for controlling the centre wavelength and spectral profile of an intrinsic guided-wave Bragg grating according to claim 19 wherein said structural member is a cantilever beam having a neutral axis, said grating being attached to said cantilever beam at a preselected angle with respect to said neutral axis.

* * * * *